US009494436B2

(12) United States Patent
Yanku

(10) Patent No.: US 9,494,436 B2
(45) Date of Patent: Nov. 15, 2016

(54) VISUAL PROMPTS FOR ROUTE NAVIGATION

(71) Applicant: Physical Enterprises, Inc., Vancouver (CA)

(72) Inventor: Genadi Yanku, Lake Oswego, OR (US)

(73) Assignee: Physical Enterprises, Inc., Vancouver, British Columbia (CA)

( * ) Notice: Subject to any disclaimer, the term of this patent is extended or adjusted under 35 U.S.C. 154(b) by 248 days.

(21) Appl. No.: 13/898,271

(22) Filed: May 20, 2013

(65) Prior Publication Data

US 2014/0343843 A1 Nov. 20, 2014

(51) Int. Cl.
*G01C 21/26* (2006.01)
*G01C 21/20* (2006.01)
*G01C 21/36* (2006.01)

(52) U.S. Cl.
CPC ............ *G01C 21/265* (2013.01); *G01C 21/20* (2013.01); *G01C 21/26* (2013.01); *G01C 21/3632* (2013.01); *G01C 21/3661* (2013.01)

(58) Field of Classification Search
None
See application file for complete search history.

(56) References Cited

U.S. PATENT DOCUMENTS

| 6,711,501 | B2 * | 3/2004 | McClure | A01B 69/008 340/588 |
| 8,825,390 | B2 * | 9/2014 | Chen et al. | 701/439 |
| 2003/0187577 | A1 * | 10/2003 | McClure | A01B 69/008 701/23 |
| 2008/0120029 | A1 * | 5/2008 | Zelek et al. | 701/213 |
| 2008/0234932 | A1 * | 9/2008 | Lee | 701/213 |
| 2010/0292925 | A1 * | 11/2010 | Hsu | 701/213 |
| 2014/0180582 | A1 * | 6/2014 | Pontarelli et al. | 701/494 |
| 2014/0343843 | A1 * | 11/2014 | Yanku | 701/491 |

OTHER PUBLICATIONS

Bertucci, K., "Transform Your Bike Into a Smart Bike With Helios Bars," GadgetReview.com, May 22, 2013, <http://www.gadgetreview.com/2013/05/transform-your-bike-into-a-smart-bike-with-helios-bars.html> [retrieved Aug. 10, 2013], 3 pages.
Denison, D.C., "Maker Faire for Start-Ups," MakeZine.com, May 18, 2013, <http://blog.makezine.com/2013/05/18/maker-faire-for-start-ups/> [retrieved May 30, 2013], 3 pages.

(Continued)

*Primary Examiner* — Redhwan K Mawari
*Assistant Examiner* — Edward Torchinsky
(74) *Attorney, Agent, or Firm* — Clayton, McKay & Bailey, PC

(57) ABSTRACT

A portable navigation prompt device comprises a processor; a wireless communication module; a discrete light source arrangement; and a memory having stored therein executable instructions configured to cause the portable navigation prompt device to establish wireless communication with a master navigation device configured to generate route navigation events based on progress along a navigable route; receive information representing a route navigation event from the master navigation device, wherein the route navigation event is selected from a plurality of available route navigation events; and output a route navigation prompt that corresponds to the first route navigation event, wherein the route navigation prompt comprises a first illumination of the discrete light source arrangement that distinguishes the route navigation event from other available route navigation events. The discrete light source arrangement may comprise, for example, a plurality of light emitting diodes (LEDs).

19 Claims, 13 Drawing Sheets

(56) References Cited

OTHER PUBLICATIONS

Gibbs, K., "Helios Bars—Transform Any Bike Into a Smart Bike," KickStarter.com, <http://www.kickstarter.com/projects/kennygibbs/helios-bars-transform-any-bike-into-a-smart-bike> [retrieved Aug. 10, 2013], 17 pages.

Grant, R., "10 HAXLR8R Startups Return From China to Unveil Ready-for-Market Hardware," VentureBeat.com, May 13, 2013, <http://venturebeat.com/2013/05/13/10-haxlr8r-startups-return-from-china-to-unveil-ready-for-market-hardware/> [retrieved May 30, 2013], 4 pages.

Lawler, R., "Our Favorite Startups From China-Based Hardware Accelerator Haxlr8r's Second Demo Day" TechCrunch.com, May 13, 2013, <http://techcrunch.com/2013/05/13/haxlr8r-demo-day/> [retrieved May 30, 2013], 3 pages.

Moseman, A., "Helios Smart Handlebars Feature Turn-by-Turn Directions," PopularMechanics.com, May 21, 2013, <http://www.popularmechanics.com/how-to/blog/helios-smart-handlebars-feature-turn-by-turn-directions-15500447> [retrieved May 30, 2013], 3 pages.

Nicholson, I., "Suunto Ambit Review: Altimeter Watches," OutdoorGearLab.com, Mar. 21, 2013, <http://www.outdoorgearlab.com/Altimeter-Watch-Reviews/Suunto-Ambit> [retrieved May 2, 2013], 5 pages.

O'Brien, T., "Jawbone Up Review (2012): A Reboot and a Shot at Redemption," Engadget.com, Dec. 7, 2012, <http://www.engadget.com/2012/12107/jawbone-up-review-2012/> [retrieved May 2, 2013], 13 pages.

Sakr, S., "TomTom Makes Own-Brand GPS Sports Watches, No Nike Swoosh in Sight (Updated: Details),"Engadget.com, Apr. 17, 2013, <http://www.engadget.com/2013/04/17/tomtom-gps-watch-launch/> [retrieved May 2, 2013], 5 pages.

Sullivan, D., "Life With the Nike FuelBand Activity Tracker," Engadget.com, Apr. 2, 2013, <http://news.cnet.com/8301-33620_3-57577376-278/life-with-thenike-fuelband-activity-tracker/> [retrieved May 2, 2013], 18 pages.

Wollman, D., "Fitbit Ultra Review," Engadget.com, Oct. 3, 2011, <http://www.engadget.com/2011/10/03/fitbit-ultra-review/> [retrieved May 2, 2013], 8 pages.

Wollman, D., "Larklife Fitness Tracker Syncs Your Data Over Bluetooth, Knows When You're Running Instead of Walking," Oct. 8, 2012, <http://www.engadget.com/2012/10/08/larklife-fitness-tracker-announced/> [retrieved May 2, 2013] 5 pages.

* cited by examiner

VISUAL PROMPTS FOR ROUTE NAVIGATION

BACKGROUND

In recent years, portable navigation devices (e.g., GPS devices) have become commonplace. GPS technology has now been miniaturized to the point where multi-purpose handheld computing devices (e.g., smart phones) now commonly include GPS receivers. When combined with mapping and route navigation software, these devices provide a convenient way for users to get directions and plan routes. However, such devices are still too large and difficult to handle for many navigation scenarios, such as when the user is running, riding a bicycle, or navigating difficult terrain. In such scenarios, it may be inconvenient or even dangerous to handle and interact with a smart phone in order to check a map or assess progress along an intended route.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a portable device comprises a processor; a wireless communication module; a discrete light source (e.g., light emitting diode (LED)) arrangement; and a memory having stored therein executable instructions configured to cause the portable device to establish wireless communication with a master navigation device configured to generate route navigation events based on progress along a navigable route; receive information representing a first route navigation event selected from a plurality of available route navigation events; and output a first route navigation prompt that corresponds to the first route navigation event. The first route navigation prompt in some embodiments comprises a first illumination of the discrete light source arrangement that distinguishes the first route navigation event from other available route navigation events. The discrete light source arrangement may comprise, for example, a multi-color light emitting diode (LED) or a plurality of single-color and/or multi-color LEDs. The portable device also can receive information representing a second route navigation event from the master navigation device and output a second route navigation prompt that corresponds to the second route navigation event. The second route navigation prompt in some embodiments comprises a second illumination of the discrete light source arrangement that distinguishes the second route navigation event from other available route navigation events. For example, the first illumination may comprise illumination of a multi-color LED (e.g., a red-green-blue LED or other combination of two or more colors) in a first color state, and the second illumination may comprise illumination of the multi-color LED in a second color state. As another example, the first illumination may comprise illumination of at least one single-color LED having a first color, and the second illumination may comprise illumination of at least one single-color LED having a second color that differs from the first color. The portable device typically will include a housing, and the discrete light source arrangement can emit light that is visible through the housing. For example, each discrete light source may be positioned to emit light through a corresponding aperture in the housing. Visual navigation prompts may be accompanied by other feedback, such as a vibration or an audible sound.

In another aspect, a wearable device comprises a processor; a wireless communication module; a user input device; an LED arrangement (e.g., a linear arrangement or a two-dimensional arrangement) comprising a plurality of LEDs; and a memory having stored therein executable instructions configured to cause the wearable device to establish communication with a portable master navigation device (e.g., a smart phone with navigation functionality) via the communication module in response to input received via the user input device, the portable master navigation device being configured to generate route navigation events based on progress along a navigable route; receive information representing a first route navigation event selected from a plurality of available route navigation events; and output a first route navigation prompt that corresponds to the first route navigation event. The first route navigation prompt in some embodiments comprises illumination of a first set of one or more of the plurality of LEDs, and the illumination of the first set of LEDs distinguishes the first route navigation event from other available route navigation events. For example, if the first route navigation event comprises a turn event having a turn direction, the illumination of the first set of LEDs may comprise illumination at a position in the LED arrangement that corresponds to the turn direction. The wearable device also can receive information representing a second route navigation event from the portable master navigation device; and output a second route navigation prompt that corresponds to the second route navigation event. The second route navigation prompt in some embodiments comprises illumination of a second set of one or more of the plurality of LEDs that distinguishes the second navigation event from other available navigation events. The first set of LEDs and the second set of LEDs may be disjoint sets, or they may share at least one LED.

In another aspect, a wireless communication link is established between a wearable navigation prompt device comprising a plurality of LEDs and a portable master navigation device with GPS functionality, the portable master navigation device being configured to generate route navigation events based on progress along a navigable route. The wearable navigation prompt device receives information representing a route navigation event from the portable master navigation device, the route navigation event being selected from a plurality of available route navigation events. The wearable navigation prompt device outputs a route navigation prompt that corresponds to the route navigation event. The route navigation prompt in some embodiments comprises illumination of a set of one or more of the plurality of LEDs that distinguishes the route navigation event from other available route navigation events. The wearable navigation prompt device may comprise a heart rate sensor, and the wearable navigation prompt device may transmit heart rate information to the portable master navigation device (e.g., for display or further processing).

In another aspect, a portable master navigation device transmits information representing a route navigation event to a portable navigation prompt device comprising a discrete light source arrangement. The route navigation event is selected from a plurality of available route navigation events. The transmitted information is configured to cause the navigation prompt device to output a route navigation prompt that corresponds to the route navigation event. The route navigation prompt comprises an illumination of the discrete light source arrangement. The illumination distinguishes the route navigation event from other available route navigation events. The portable master navigation device also may receive other information (e.g., heart rate information) from the navigation prompt device.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
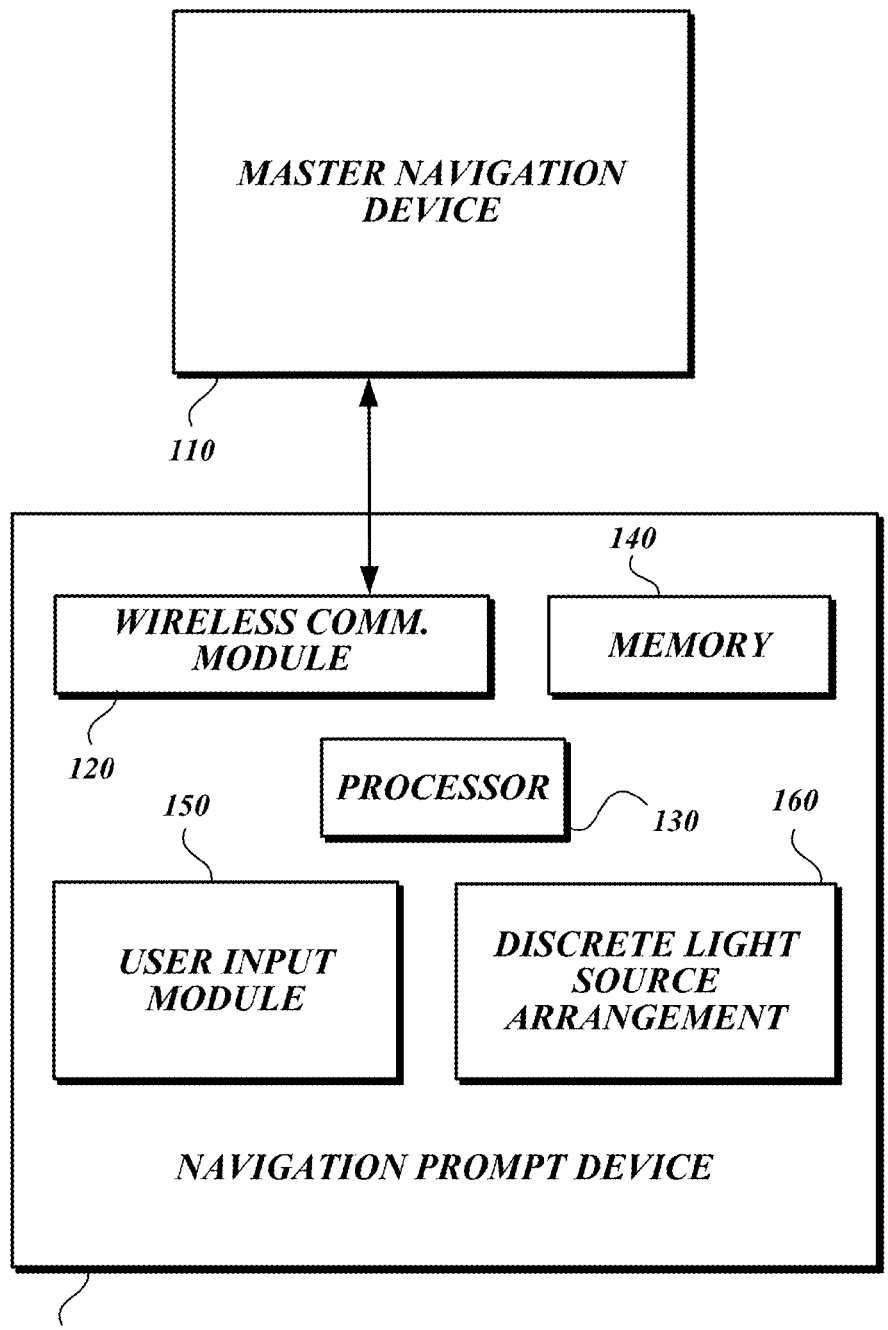
FIG. 1 is a block diagram of an illustrative system architecture for a portable navigation prompt device having a discrete light source arrangement.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure describes various devices, systems, and processes that enable users that are navigating a route to receive navigation prompts that are useful and easily understood. For example, runners, bicyclists, hikers, or any user that wishes to navigate a route can benefit from the devices, systems, and processes described herein. Embodiments described herein can be used in a fitness or competitive sport context, or in a more casual context, such as when exploring a new city or neighborhood.

Various embodiments of a portable navigation prompt device are described. In one embodiment, a portable navigation prompt device is a wearable device that can be worn on the wrist like a wristwatch, or on some other part of the body. Alternatively, the portable navigation prompt device can be held, mounted (e.g., on bicycle handlebars or automobile dashboard), or carried in some other way.

In various described embodiments, a portable route navigation prompt device (which is also referred to herein as a "navigation prompt device") is used in combination with a master navigation device such as a smart phone or other mobile computing device with navigation functionality. The master navigation device stores route information and obtains location information (e.g., via a GPS module), which it uses to generate route navigation events (e.g., turn events, arrive-at-destination events, off-route events, and the like). The route navigation events are transmitted to the navigation prompt device, which outputs prompts in the form of illuminations of a discrete light source arrangement (e.g., a light emitting diode (LED) arrangement). The prompts can alert the user to turn left, turn right, continue in the current direction, or take some other action. The user can, therefore, be presented with navigation prompts without having to interact directly with the master navigation device.

In one illustrative scenario, prior to setting out on a bicycle ride, a user can define a route or download a pre-defined route to a smart phone with GPS functionality. In order to protect the smart phone from damage and to keep the user's hands free, the user may carry the smart phone in a backpack, pocket, or some other secure location that may be hard to reach while in motion. In contrast, the navigation prompt device may be worn on the user's wrist, mounted to the handlebars of the bicycle, or carried in some other easily accessible location. A wireless communication link is established between the smart phone and the navigation prompt device. The smart phone then can send information representing route navigation events to the navigation prompt device, which outputs prompts as the user progresses along the route. In this way, the user is able to receive navigation prompts without directly interacting with the smart phone. Avoiding direct interaction with the smart phone can help to conserve battery life of the smart phone (e.g., by allowing the display to remain off during navigation). Further, limiting interaction with the smart phone while in motion can help to avoid unnecessary distractions and reduce the risk of damage (e.g., from accidentally dropping the smart phone while it is being handled).

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 is a block diagram of an exemplary system architecture for a navigation prompt device 100 configured for communication with a master navigation device 110 (e.g., a smart phone with GPS and mapping functionality). In the example shown in FIG. 1, the navigation prompt device includes a wireless communication module 120, a processor 130, memory 140, a user input module 150 comprising one or more user input devices, and a discrete light source arrangement 160 for outputting navigation prompts. For simplicity, some components (e.g., a power source) of the navigation prompt device 100 are not shown in FIG. 1. Similarly, conventional components of computing devices with GPS and mapping functionality are well known and are not described in detail.

The wireless communication module 120 processes signals for wireless communication. For example, the wireless communication module 120 can operate in accordance with the Bluetooth® standard to communicate wirelessly with the master navigation device 110 within a limited distance. In one scenario, the navigation prompt device 100 and the master navigation device 110 are Bluetooth-enabled devices that wirelessly connect to each other through a process called "pairing." Once the devices are paired, they can send and receive data (e.g., information relating to route navigation) between them via radio waves (e.g., in a 2.4 GHz frequency band). The maximum distance over which Bluetooth-enabled devices can communicate with each other varies depending on implementation (e.g., between 10 m and 100 m). Communication between Bluetooth-enabled devices is well-known, and further description is omitted for the sake of brevity. Alternatively, other well-known short-range or longer-range communication protocols can be used for communication between the navigation prompt device 100 and the master navigation device 110.

The processor 130 is responsible for overall functioning of the navigation prompt device 100 and executes program code. The program code can include code for interpreting and responding to user input (e.g., button presses) received from the user input module 150, communicating with the master navigation device 110 via the wireless communication module 120, power management, turning the device on or off, or other tasks. As used herein, the term processor refers generally to circuitry that processes computer-executable instructions, and may be implemented as a microcontroller or other circuitry suitable for controlling and performing the functions of the navigation prompt device 100.

Program code can be stored in memory 140 and/or in some other location, such as in storage located in the processor itself. The memory 140 can be any suitable memory, such as programmable read-only memory (PROM) or flash memory. The type of memory used can depend on the type of information to be stored. In a typical scenario, some data (e.g., program code for core device functions) used by the processor 130 is pre-loaded into the navigation prompt device 100 and is generally not configurable by a user, while other data may be added or configured by a user.

In some embodiments, the user input module 150 comprises a single hardware button. The button can be used to establish a communication link with the master navigation device 110 to start or stop navigation prompts once a communication has been established or for other purposes. Alternatively, the hardware button can be replaced with another suitable user input device or with multiple devices suitable for receiving user input.

The discrete light source arrangement 160 includes an arrangement of one or more discrete light sources (e.g., LEDs) that can provide navigation prompts to a user based on navigation event information received from the master navigation device 110. For example, as a user moves along a route programmed into the master navigation device 110, the master navigation device 110 sends information representing navigation events (e.g., turn events, arrive-at-destination events, off-route events, and the like) depending on the user's location, direction of movement, etc. The navigation prompt device 100 outputs navigation prompts (via the discrete light source arrangement 160) that correspond to the navigation events. For example, illuminating one set of discrete light sources in the arrangement 160 can correspond to a left-turn prompt, and illuminating another set of discrete light sources in the arrangement 160 can correspond to a right-turn prompt. The discrete light sources in the arrangement 160 can be any suitable light sources, such as LEDs, organic LEDs (OLEDs), laser diodes, and the like. Various characteristics of the illumination (e.g., number of illuminated light sources, position or geometry of illuminated light sources, color, intensity, flashing, etc.) can be used independently or in any combination to prompt the user in ways that distinguish navigation events from one other. The illuminations also can be accompanied by other output such as audible sounds or vibration, which may be generated by components of a suitably configured navigation prompt device, by the master navigation device 110, or by some other device. Illustrative navigation events and corresponding navigation prompts are described in further detail below.

The navigation prompt device 100 typically will include a housing (not shown in FIG. 1), and the discrete light source arrangement 160 can emit light that is visible through the housing. For example, each discrete light source may be positioned to emit light through a corresponding aperture in the housing.

Variations of the architecture shown in FIG. 1 are possible. For example, navigation prompt devices may include additional components, fewer components, different components, or different arrangements or configurations of components. Further, other features of components and interactions between components shown in FIG. 1 are possible.

Figure 2A:
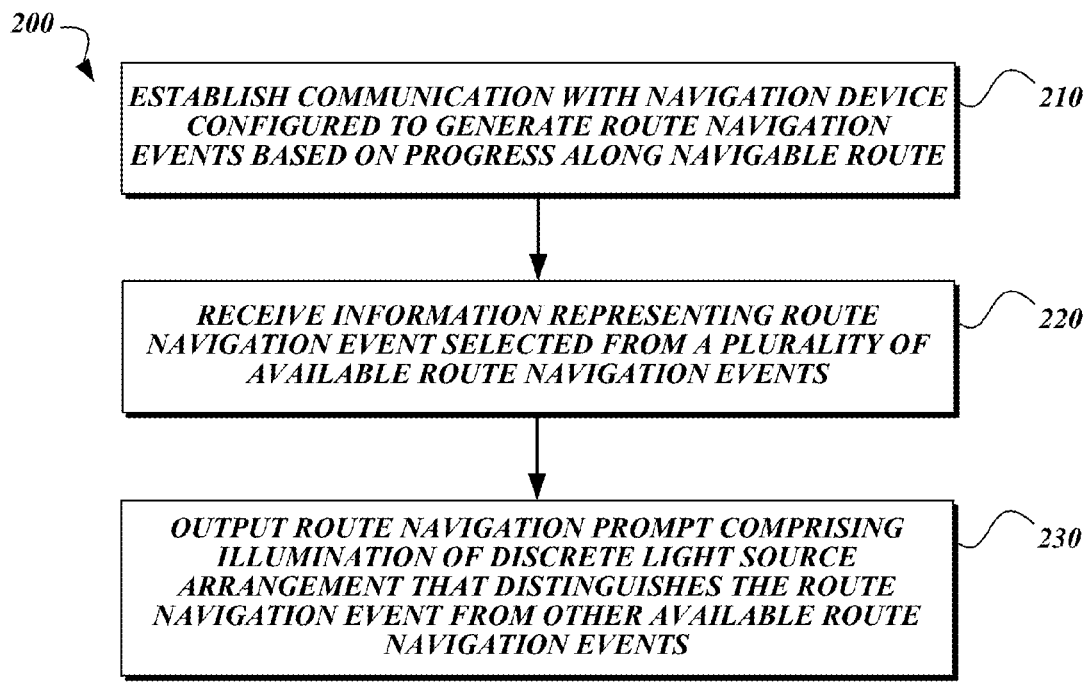
FIG. 2A is a flow chart of a process in an illustrative usage scenario for a portable navigation prompt device having a discrete light source arrangement.

FIG. 2A is a flow chart of a process 200 in an illustrative usage scenario for a navigation prompt device. In step 210, the navigation prompt device (e.g., navigation prompt device 100 shown in FIG. 1) establishes communication with a master navigation device (e.g., master navigation device 110 shown in FIG. 1) configured to generate route navigation events based on progress along a route. For example, the master navigation device 110 uses location information obtained from a GPS module to track movement of the master navigation device relative to a programmed route and to generate corresponding navigation events. In step 220, the navigation prompt device receives information representing a route navigation event selected from a plurality of available route navigation events (e.g., turn events, arrive-at-destination events, off-route events, and the like). In step 230, the navigation prompt device outputs a route navigation prompt comprising illumination of the discrete light source arrangement. The illumination distinguishes the route navigation event from other available route navigation events and can prompt the user to take appropriate action (e.g., turn right, turn left, turn around in order to return to the route, stop when a destination has been reached, or the like).

Figure 2B:
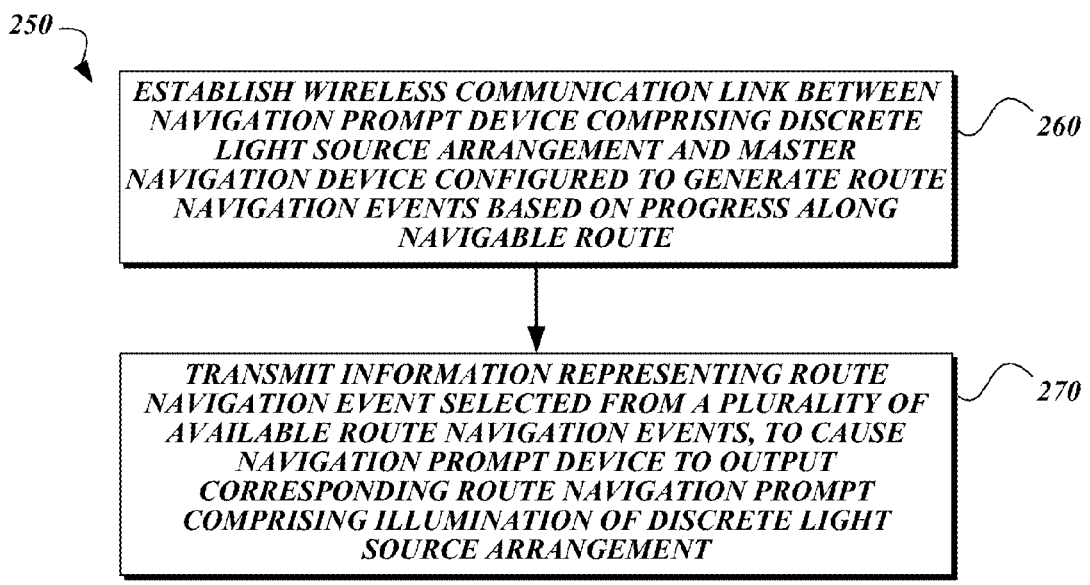
FIG. 2B is a flow chart of a process in an illustrative usage scenario for a master navigation device in communication with a navigation prompt device having a discrete light source arrangement.

FIG. 2B is a flow chart of a process 250 in an illustrative usage scenario for a master navigation device (e.g., master navigation device 110 shown in FIG. 1) that communicates with a navigation prompt device (e.g., navigation prompt device 100 shown in FIG. 1). For example, the master navigation device may be a smart phone running an application that allows the master navigation device to communicate with the navigation prompt device by transmitting information configured to cause illumination of a discrete light source arrangement (e.g., an LED arrangement) on the navigation prompt device. In step 260, a wireless communication link is established between the navigation prompt device and the master navigation device. The master navigation device is configured to generate route navigation events based on progress along a navigable route. In step 270, the master navigation device transmits information representing a route navigation event selected from a plurality of available route navigation events. The transmitted information is configured to cause the navigation prompt device to output a corresponding route navigation prompt comprising an illumination of the discrete light source arrangement.

Figure 3A:
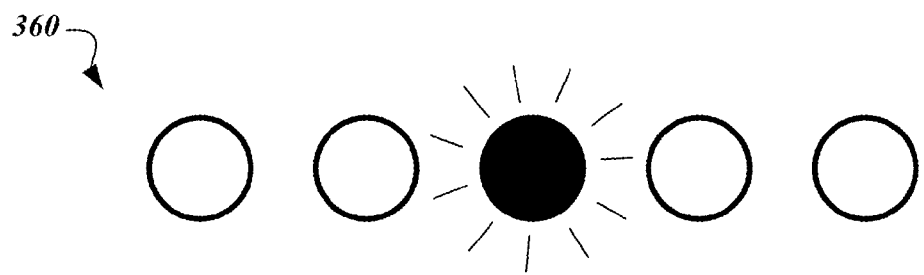
FIGS. 3A, 3B, and 3C show illustrative illuminations of a linear arrangement of discrete light sources suitable for route navigation prompts.
Figure 3B:
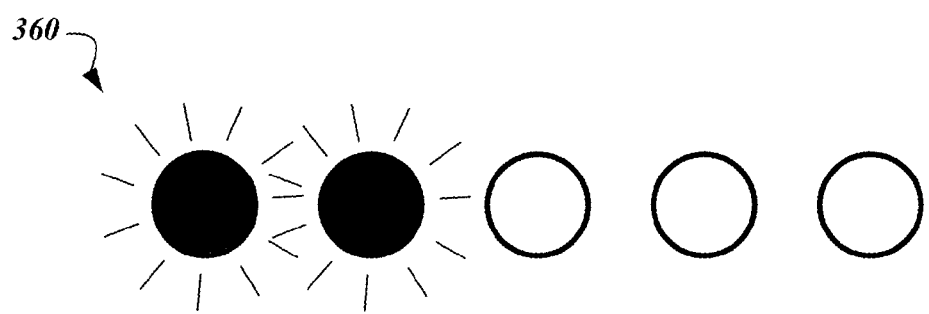
Figure 3C:
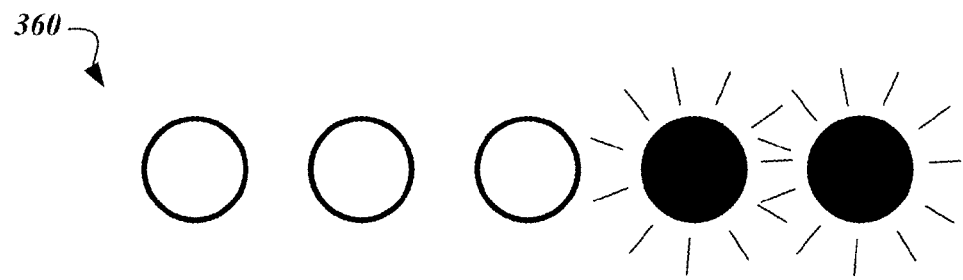
Figure 4A:
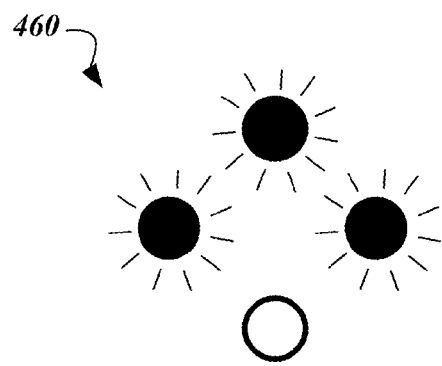
FIGS. 4A, 4B, and 4C show illustrative illuminations of a two-dimensional arrangement of discrete light sources suitable for route navigation prompts.
Figure 4B:
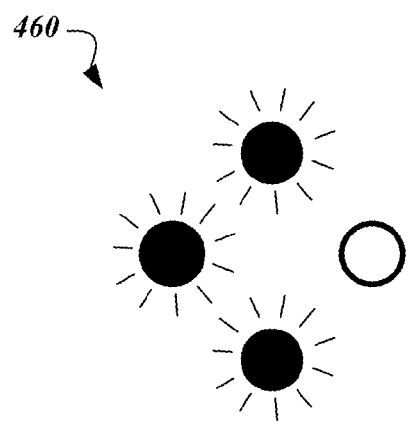
Figure 4C:
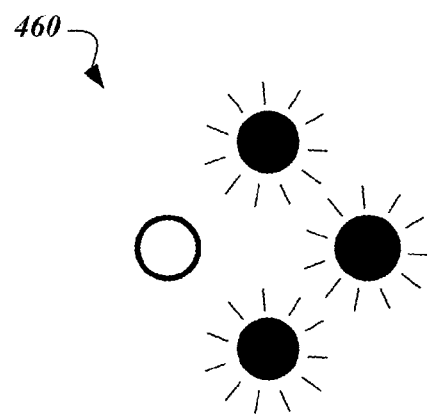

A discrete light source arrangement can take any number of different forms. FIGS. 3A, 3B, and 3C show illustrative illuminations of discrete light sources in a linear arrangement 360. In the illumination shown in FIG. 3A, a center light source in the linear arrangement 360 is lit to prompt the user to continue forward in the present direction. In the illumination shown in FIG. 3B, two light sources on the left side of the linear arrangement 360 are lit to prompt the user to turn left. In the illumination shown in FIG. 3C, two light sources on the right side of the linear arrangement 360 are lit to prompt the user to turn right. FIGS. 4A, 4B, and 4C show illustrative illuminations of discrete light sources in a two-dimensional arrangement 460. In the illumination shown in FIG. 4A, the top, left, and right light sources are lit to generally form an upward arrow that prompts the user to continue forward in the present direction. In the illumination shown in FIG. 4B, the top, left, and bottom light sources are lit to generally form a leftward arrow that prompts the user to turn left. In the illumination shown in FIG. 4C, the top, right, and bottom light sources are lit to generally form a rightward arrow that prompts the user to turn right.

The illustrative arrangements and illuminations shown in FIGS. 3A-4C are only examples. Other arrangements and distinctive illuminations can be used for similar prompts or for prompts corresponding to different events, such as a prompt to alert the user when the user has moved off of a selected route (i.e., an off-route event) or a prompt to indicate that the user has arrived at the destination (i.e., an arrive-at-destination event). Alternative arrangements can include any other number, configuration, or suitable type of discrete light sources. Further, characteristics other than position and geometry can be used to distinguish navigation events from one another. In one embodiment, single-color LEDs having a particular color are assigned to particular prompts. For example, a green LED can be used to prompt the user to continue forward, blue LEDs can be used to prompt the user to turn left, and red LEDs can be used to prompt the user to turn right. Alternatively, multi-color LEDs (e.g., tri-color LEDs) can be used, and different color states can be assigned for different prompts. Other characteristics that may be used include flashing. For example, a turn prompt may begin at a relatively slow rate of flashing and then increase the rate of flashing as the user approaches the turn in order to alert the user that the turn is imminent. Such characteristics can be used in any distinctive combination.

Figure 5:
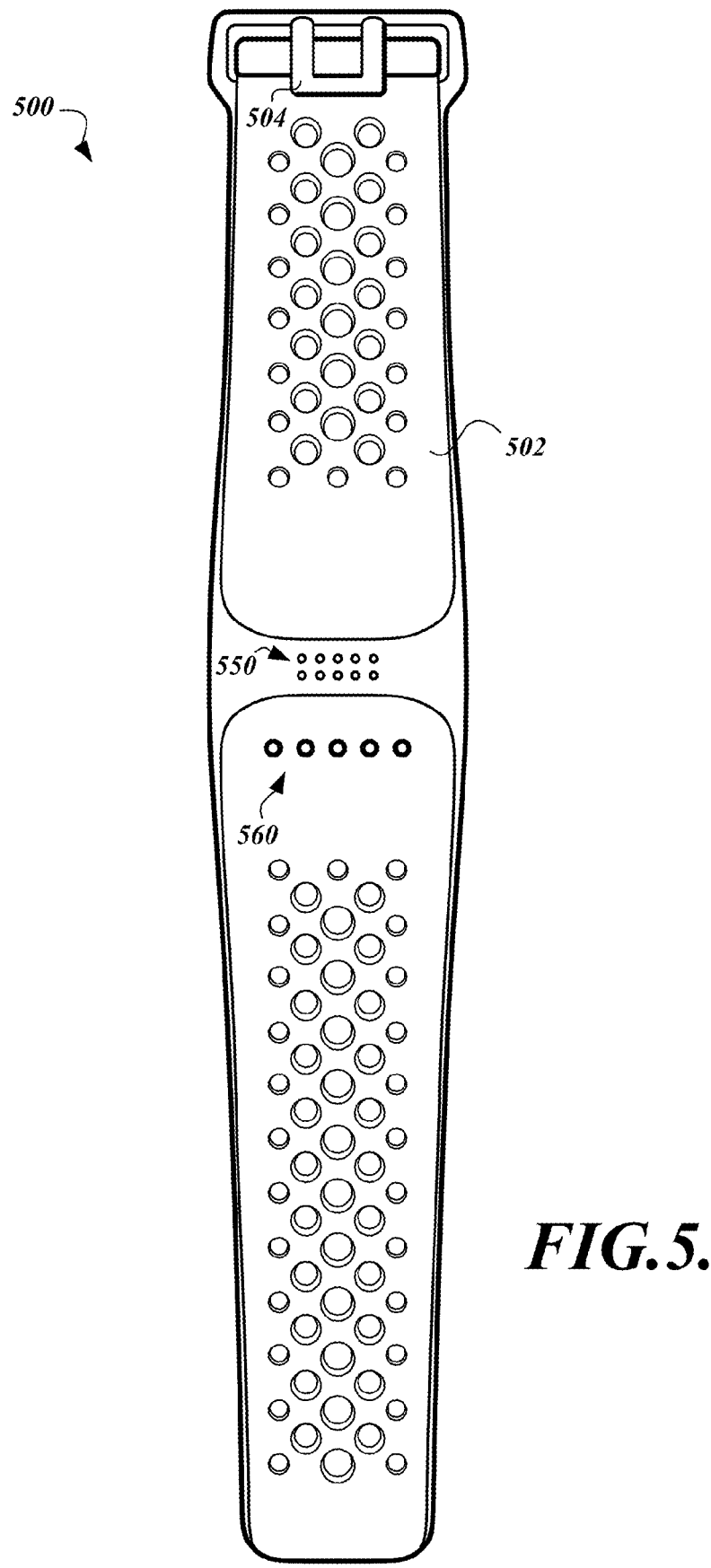
FIGS. 5, 6, and 7 show an illustrative embodiment of a wearable navigation prompt device having a linear arrangement of light emitting diodes (LEDs)
Figure 6:
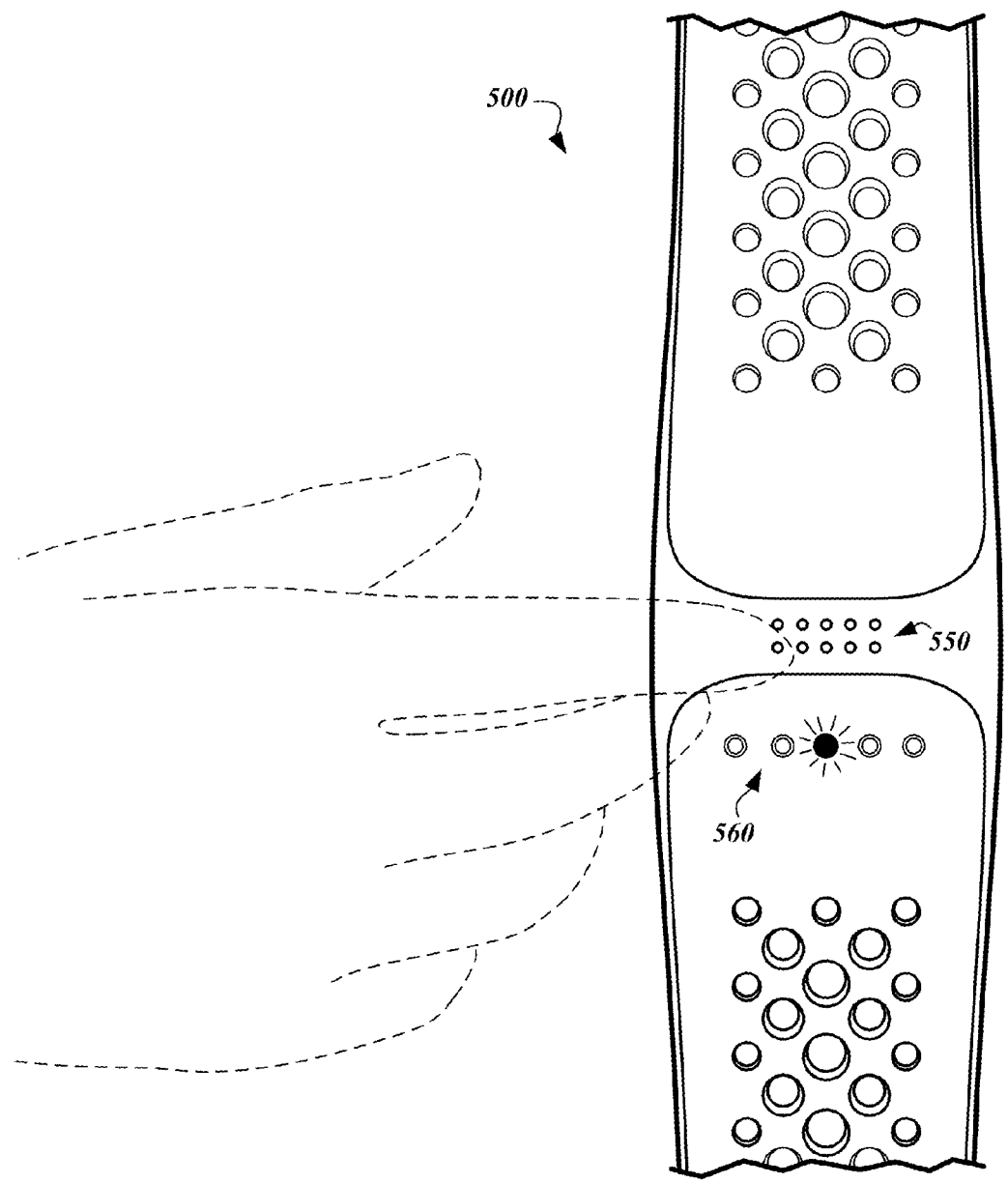
Figure 7:
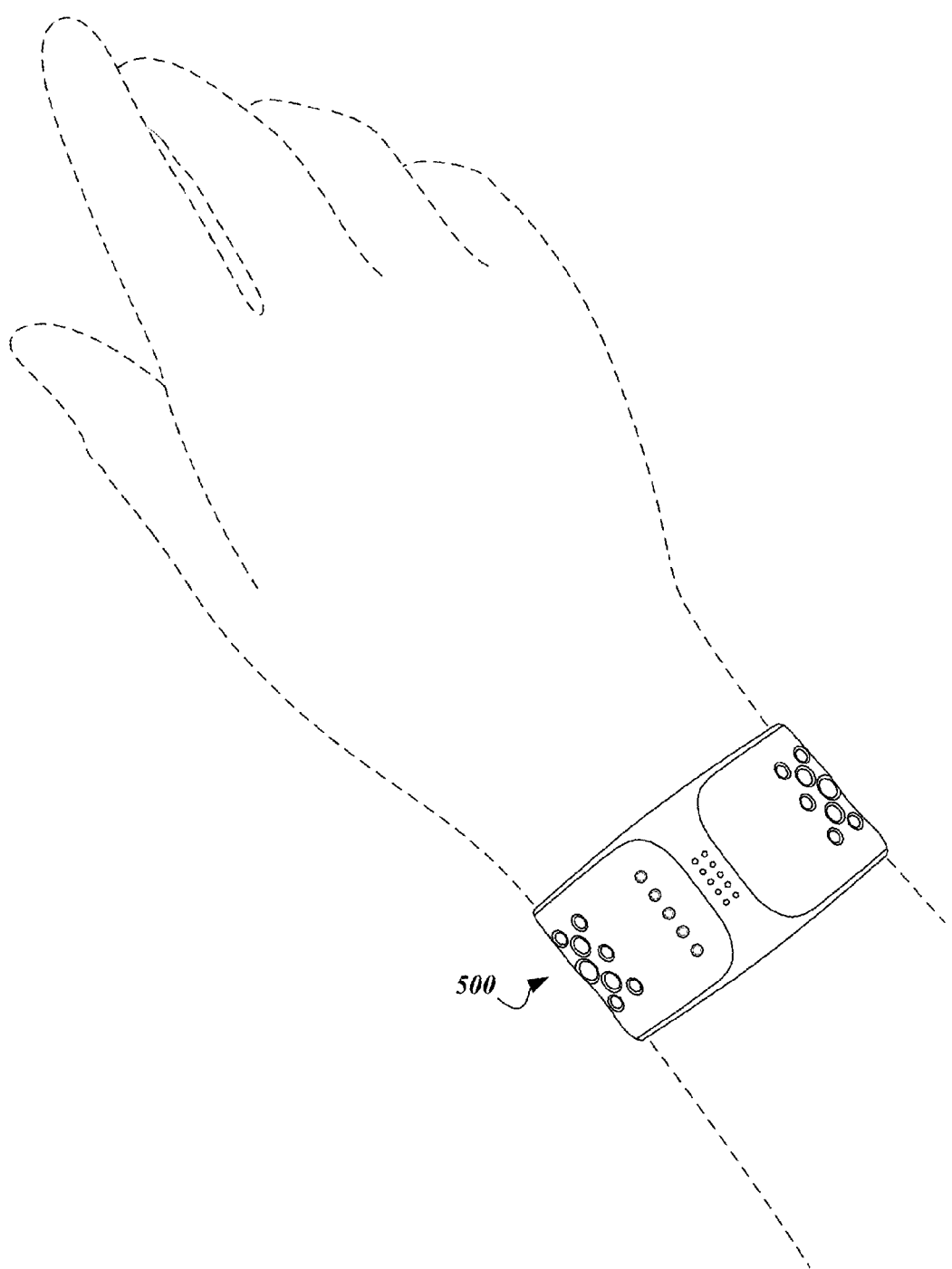

FIGS. 5-7 shows an illustrative embodiment of a wearable navigation prompt device 500. As shown in FIG. 5, the wearable device 500 includes a button 550 and an LED arrangement 560 configured to output navigation prompts. The circuitry of the wearable device 500 is generally enclosed within a housing, which is integrated with a band 502 in this example. The LED arrangement 560 emits light that is visible through the housing. In the example shown in FIG. 5, each LED is positioned to emit light through a corresponding circular aperture in the housing. Such apertures may be of any size or shape to accommodate the many possible configurations of the LED arrangement 560. Raised bumps on the button 550 may serve as an aid in finding the location of the button 550.

As shown in FIG. 6, a user can press the button 550 to initiate communication with a master navigation device (not shown), to start or stop navigation prompts, or the like. The LED arrangement can provide feedback to the user. For example, an LED can be lit to indicate that the device 500 has established a communication link with the master navigation device (not shown).

Referring again to FIG. 5, the wearable device 500 includes a band 502 to facilitate wearing the device (e.g., on the user's wrist, as shown in FIG. 7). The band 502 is made of flexible material (e.g., rubber) and includes a plurality of holes to make the band more lightweight and breathable. A buckle 504 can be used in combination with the plurality of holes in the band 502 to accommodate a wide range of wrist sizes or to attach the wearable device 500 to some other structure, such as bicycle handlebars.

FIGS. 8-12 depict features of an illustrative user interface that can be used in combination with any of the processes, devices, or systems described herein. For example, the user interfaces depicted in FIGS. 8-12 can be presented on a display of a master navigation device (e.g., a smart phone with GPS and mapping functionality) to adjust settings for navigation prompts and/or display information responsive to signals received from a navigation prompt device.

Figure 8:
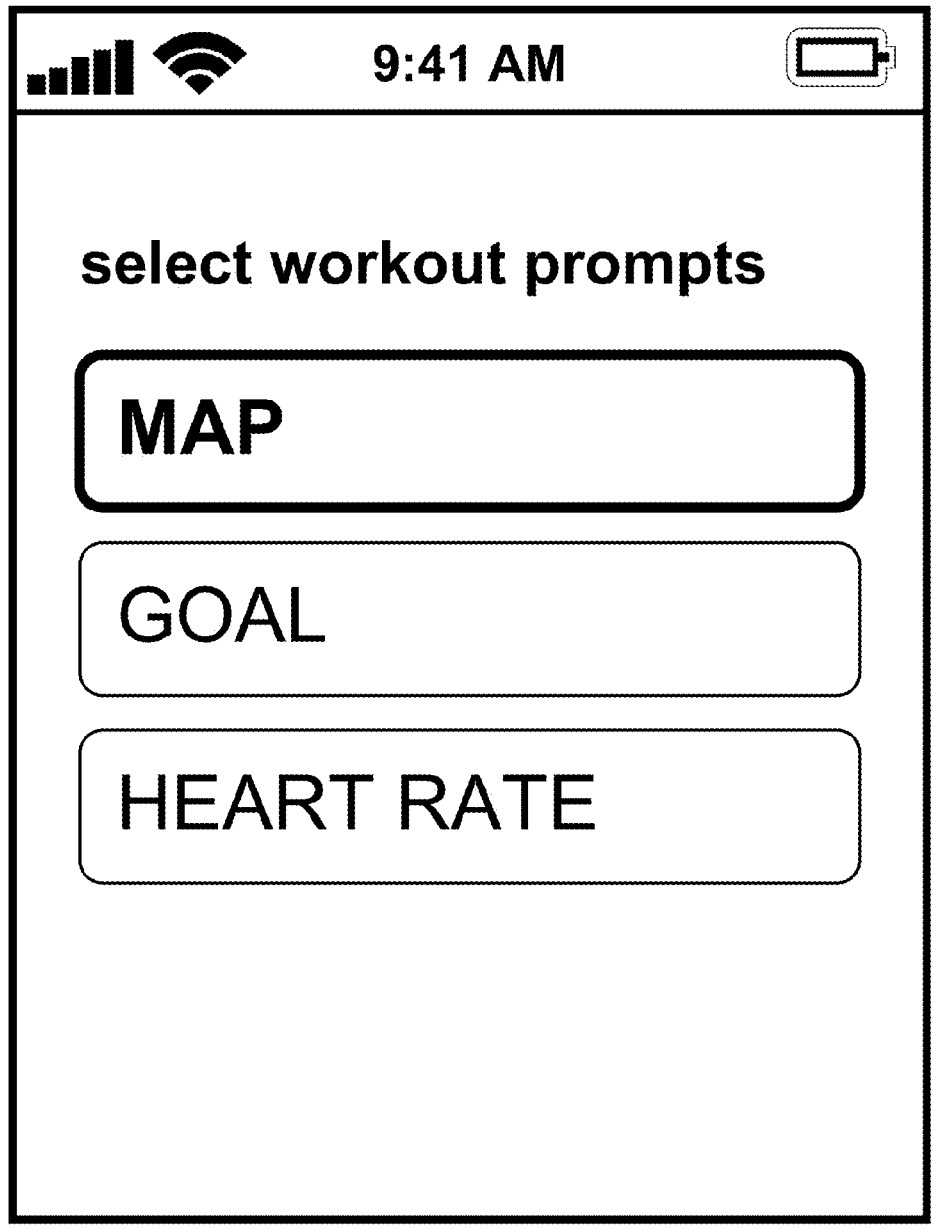
FIGS. 8, 9, 10, and 11 show illustrative screen shots of a user interface that can be used in combination with a portable navigation prompt device.

In the example shown in FIG. 8, the screen shot 890 depicts software buttons labeled "MAP," "GOAL," AND "HEART RATE." These software buttons are illustrative of a system that allows the user to set and monitor fitness goals and monitor heart rate during physical activity, in addition to providing navigation functionality. Although fitness goals and heart rate may be used in combination with navigation prompts and related systems and devices described herein, these buttons and features are optional, and are shown for purposes of illustration only.

Figure 9:
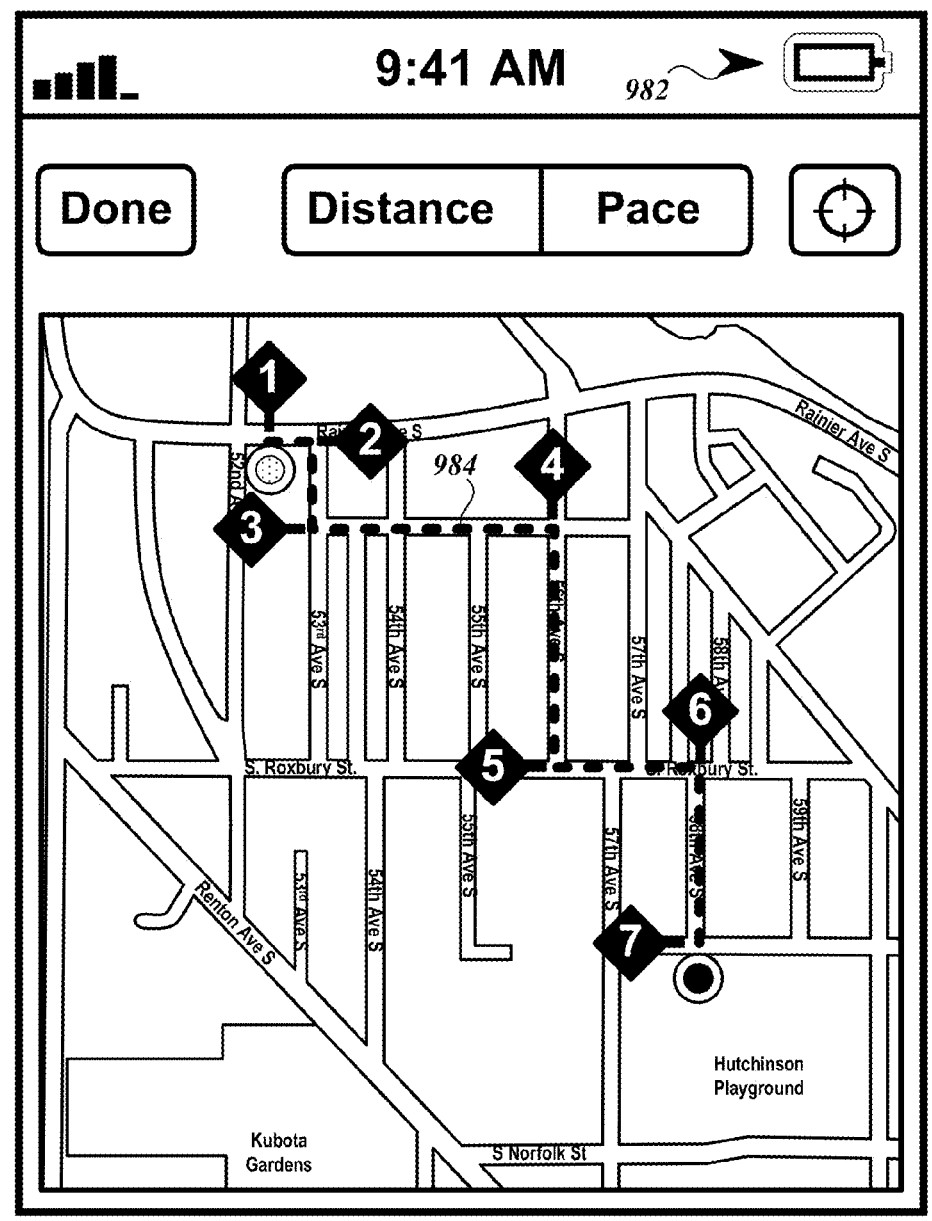
Figure 10:
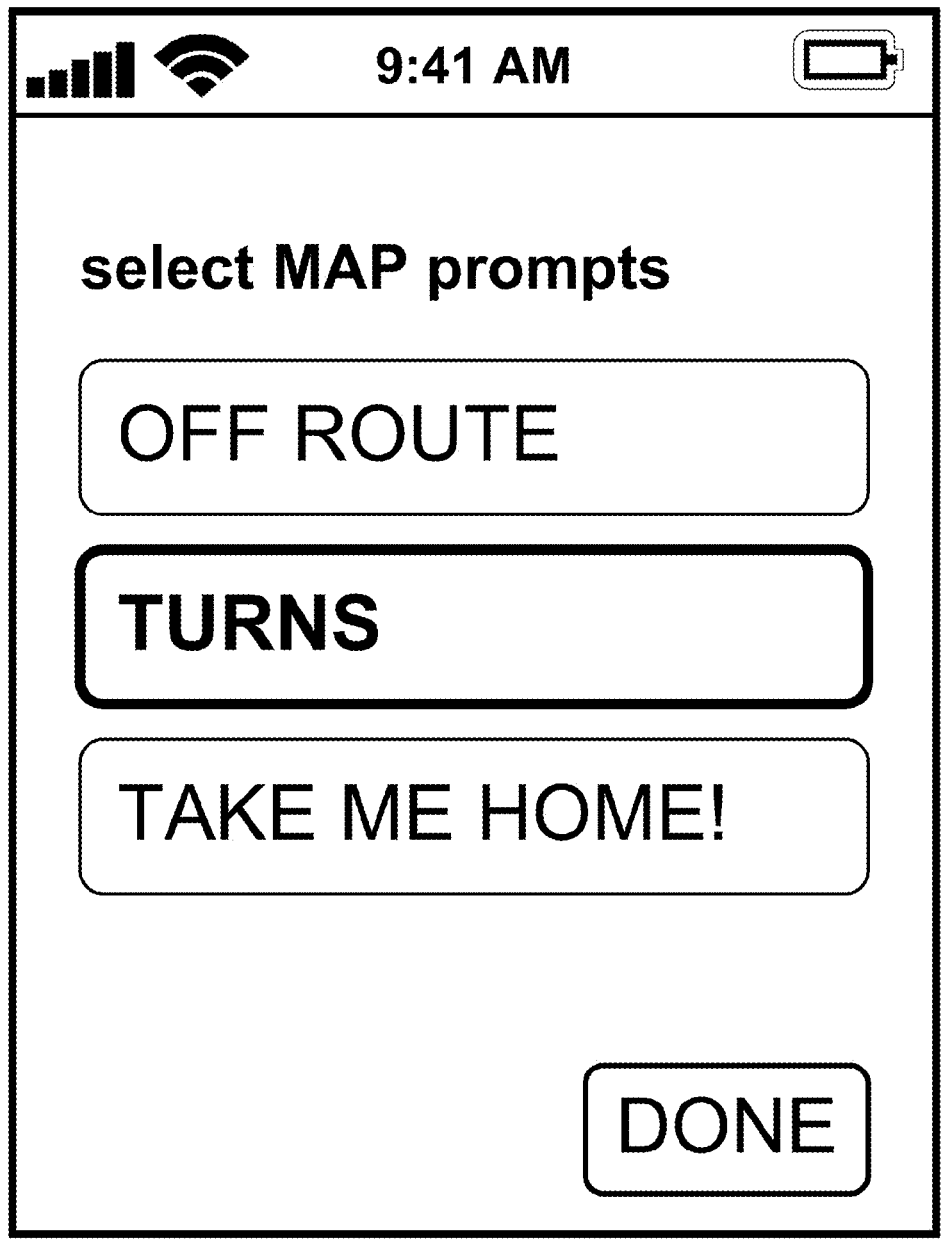

In the example shown in FIG. 8, the user can interact with the "MAP" button (e.g., by tapping a touchscreen at an appropriate location) to access pre-programmed, user-defined, or suggested (e.g., "Recommended Rides in Your Area") routes and maps. When a desired map is found and selected (e.g., via a drop down list or search criteria, such as "Find 5 mile run"), the map can be displayed along with a route to be navigated. The example screen shot 990 shown in FIG. 9 depicts a city map with a dashed line 984 representing a route to be navigated. The diamond-shaped, numbered flags represent waypoints along the route. For example, waypoint 1 indicates the start of the route, waypoint 7 indicates the destination, and waypoints 2-6 represent points at which the user will need to make a turn along the route. FIG. 9 also depicts a compass arrow 982 that indicates the user's current movement direction.

If the user is progressing along the route depicted in FIG. 9, a master navigation device may generate corresponding route navigation events, and a navigation prompt device can present corresponding prompts. For example, if the user is moving in the direction indicated by compass arrow 982, and is leaving waypoint 1 on the way to waypoint 2, the master navigation device may generate a "keep-straight" event, and the user may be presented with a corresponding prompt (e.g., the illustrative prompt shown in FIG. 3A). When the user reaches waypoint 2, the master navigation device may generate a "right turn" event, and the user may be presented with a corresponding prompt (e.g., the illustrative prompt shown in FIG. 3C).

In one embodiment, once the user has decided on a particular route, the user is presented with the opportunity to choose or adjust prompts. In the example shown in FIG. 10, the screen shot 1090 depicts software buttons labeled "OFF ROUTE," "TURNS," and "TAKE ME HOME!". If "OFF ROUTE" is selected, the user can be directed to a new screen for selecting prompts that correspond to off-route events. If "TAKE ME HOME!" is selected, the user can adjust the route and corresponding prompts to take the user back to a start point on the route (or back to a designated "home" location). In the example shown in FIG. 10, the "TURNS" button (depicted in bold) is selected to take the user to the screen shown in FIG. 11 in which settings for turn prompts can be customized.

Figure 11:
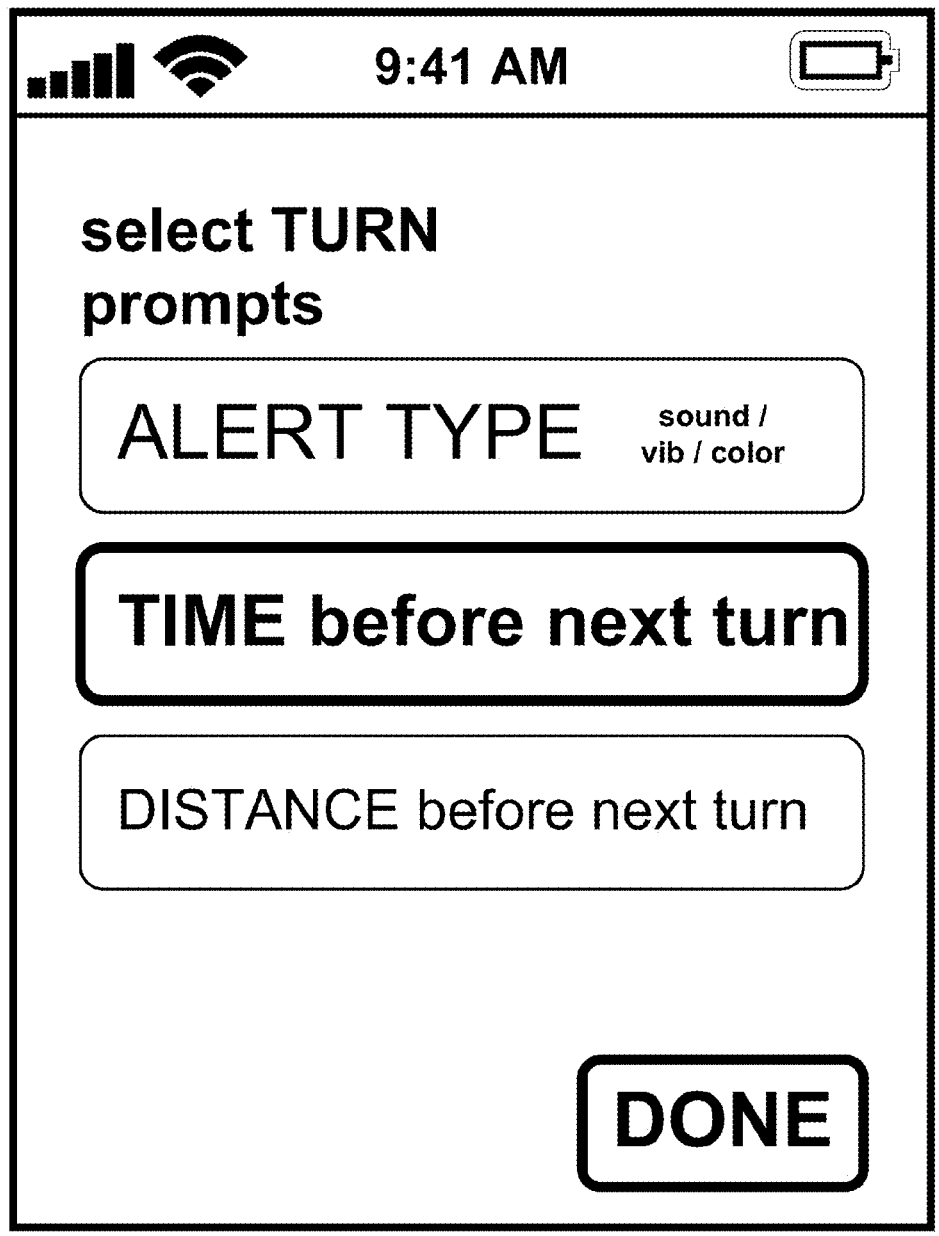

In the example shown in FIG. 11, the screen shot 1190 depicts software buttons labeled "ALERT TYPE," "TIME before next turn," and "DISTANCE before next turn." If "ALERT TYPE" is selected, the user can be directed to a new screen for selecting prompt types (e.g., whether a prompt will be accompanied by a vibration or sound, or a particular color of illumination). If "TIME before next turn" or "DISTANCE before next turn" is selected, the user can be directed to a new screen for adjusting the time or distance, respectively, at which a turn prompt will be presented. For example, the user can choose to have the navigation prompt device present a turn prompt when the next turn is 25 m away.

Figure 12:
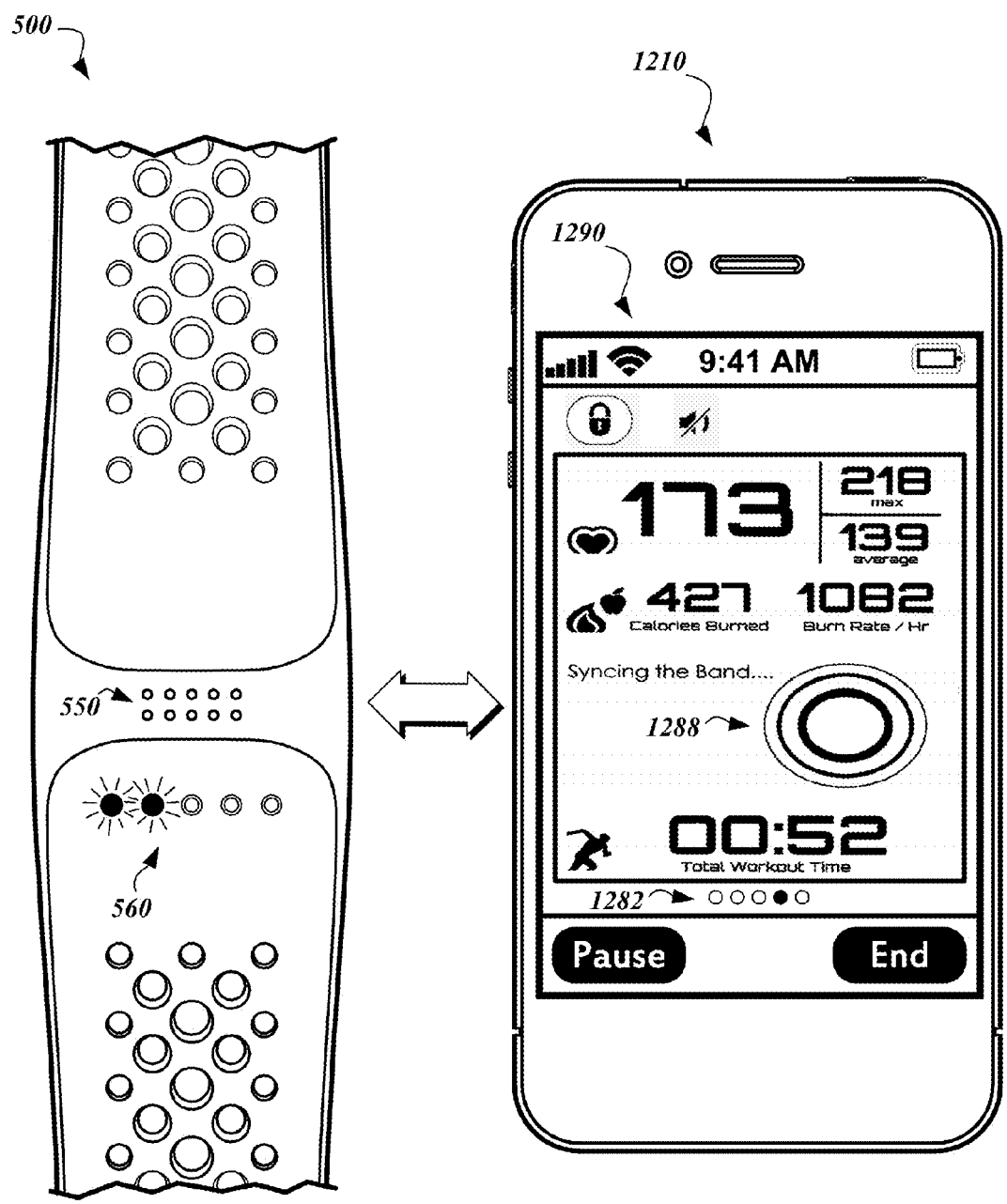
FIG. 12 shows an illustrative embodiment of a wearable navigation prompt device in communication with a portable computing device.

FIG. 12 depicts the wearable navigation prompt device 500 in communication with a smart phone 1210 having a display 1290. For example, the smart phone 120 and the wearable device 500 may each be equipped with a "Bluetooth Smart" (Bluetooth 4.0) wireless transmitter and receiver or another suitable wireless communication module. In one usage scenario, the settings of the smart phone 1210 are adjusted to enable Bluetooth functionality. The button 550 of the wearable device 500 is pressed and held (e.g., for 3 or more seconds) to establish the communication link. The smart phone 1210 and the wearable device 500 can then communicate with each other. The LED arrangement 560 can be used to indicate an attempted or successful pairing of the wearable device 500 with the smart phone 120 (e.g., by illuminating one or more of the LEDs). The communication link also can be deactivated (e.g., by pressing and holding the button 550 again).

The display 1290 depicts exercise details (e.g., "Calories Burned") along with an icon 1288 that is indicative of the established communication link. The display also includes a progress indicator 1282. The progress indicator 1282 may indicate, for example, that the user is on screen 4 of 5 screens related to the current activity. Or, the progress indicator 1282 may indicate the overall progress (e.g., 75% complete) along the route being navigated. Tracking of the activity (including, for example, navigation prompts) can be paused or ended using the software buttons labeled "Pause" and "End," respectively. The wearable device 500 may include additional components such as a heart rate sensor (not shown). In such a configuration, the display 1290 may include heart rate information obtained from the wearable device 500. Alternatively, the exercise information may include heart rate information obtained from some other device, or heart rate information may be omitted. In the example shown in FIG. 12, a current heart rate of "173" is displayed along with a peak heart rate ("218") and an average heart rate ("139").

A navigation prompt device also can be configured to indicate additional information, such as exercise information. For example, a suitably configured navigation prompt device can use LEDs that flash at a rate that corresponds to a measured heart rate. As another example, a multi-color LED (or different single-color LEDs) can be used to indicate a current heart rate zone (e.g., aerobic training, anaerobic training) based on a current heart rate. Heart rate zones may be pre-selected by a user, e.g., via a user interface on the smart phone 1210 prior to beginning exercise.

Figure 13:
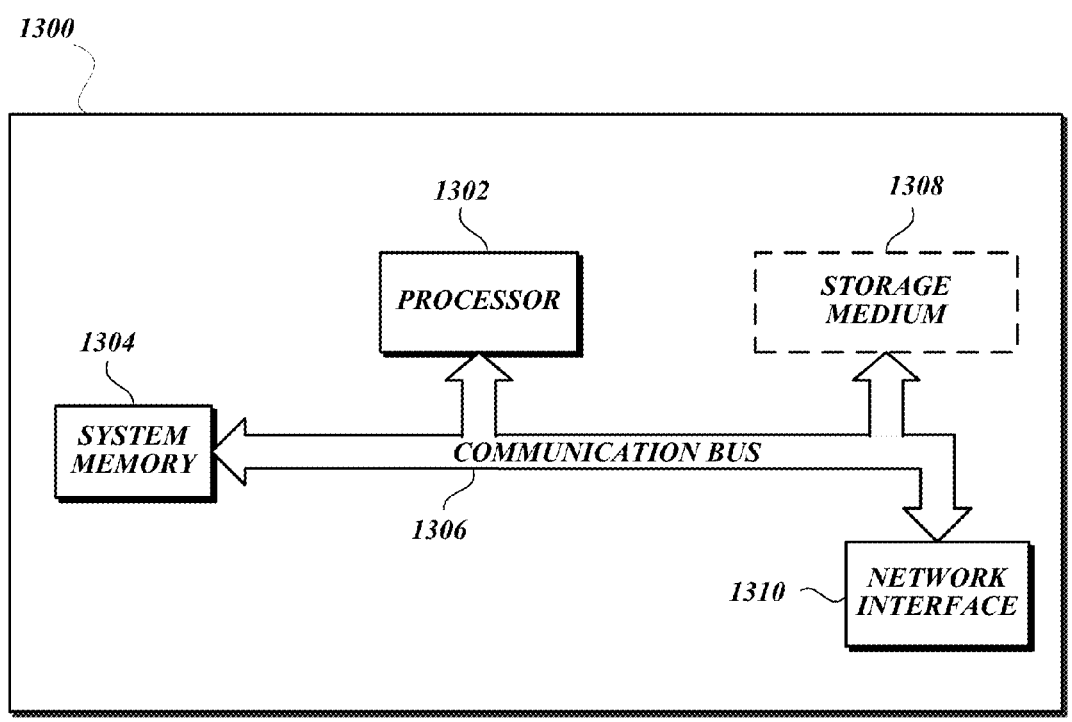
FIG. 13 is a block diagram of a generalized computing device that can be used in accordance with various aspects of the present disclosure.

FIG. 13 is a block diagram that illustrates aspects of generalized computing device 1300 that may be appropriate for use in accordance with some embodiments of the present disclosure. The description below can be applied to servers, personal computers, mobile phones, smart phones, tablet computers, embedded computing devices, and other devices that may be used in accordance with embodiments of the present disclosure. Moreover, those of ordinary skill in the art and others will recognize that the computing device 1300 may be any one of any number of currently available or yet to be developed devices.

In its most basic configuration, the computing device 1300 includes at least one processor 1302 and a system memory 1304 connected by a communication bus 1306. Depending on the exact configuration and type of device, the system memory 1304 may be volatile or nonvolatile memory, such as read only memory ("ROM"), random access memory ("RAM"), EEPROM, flash memory, or similar memory technology. Those of ordinary skill in the art and others will recognize that system memory 1304 typically stores data and/or program modules that are immediately accessible to and/or currently being operated on by the processor 1302. In this regard, the processor 1302 may serve as a computational center of the computing device 1300 by supporting the execution of instructions.

As further illustrated in FIG. 13, the computing device 1300 may include a network interface 1310 comprising one or more components for communicating with other devices over a network. Embodiments of the present disclosure may access basic services that utilize the network interface 1310 to perform communications using common network protocols. The network interface 1310 may also include a wireless network interface configured to communicate via one or more wireless communication protocols, such as WiFi, 2G, 3G, 4G, LTE, WiMAX, Bluetooth®, and/or the like.

In the exemplary embodiment depicted in FIG. 13, the computing device 1300 also includes a storage medium 1308. However, services may be accessed using a computing device that does not include means for persisting data to a local storage medium.

Therefore, the storage medium 1308 depicted in FIG. 13 is represented with a dashed line to indicate that the storage medium 1308 is optional. In any event, the storage medium 1308 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1304 and storage medium 1308 depicted in FIG. 13 are examples of computer-readable media.

For ease of illustration and because it is not important for an understanding of the claimed subject matter, FIG. 13 does not show some of the typical components of many computing devices. In this regard, the computing device 1300 may include input devices, such as a keyboard, keypad, mouse, trackball, microphone, touchpad, touchscreen, stylus, and/or the like. Such input devices may be coupled to the computing device 1300 by wired or wireless connections including RF, infrared, serial, parallel, Bluetooth®, USB, or other suitable connections protocols using wireless or physical connections. Similarly, the computing device 1300 may also include output devices such as a display, speakers, printer, etc. Connections such as USB connections also are suitable for connecting the computing device 1300 to other attached devices.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and can be stored on and executed by one or more general-purpose or special-purpose processors, thus creating a special-purpose computing device configured to provide functionality described herein.

Extensions and Alternatives

Many alternatives to the devices, systems, and processes described herein are possible. Although some examples in the present disclosure include descriptions of devices comprising specific hardware components in specific arrangements, devices, systems, and processes described herein can be modified to accommodate different hardware components, combinations, or arrangements. Further, although some examples in the present disclosure include descriptions of specific usage scenarios, devices, systems, and processes described herein can be modified to accommodate different usage scenarios.

Many alternatives to the user interfaces described herein are possible. In practice, the user interfaces described herein may be implemented as separate user interfaces or as different states of the same user interface, and the different states can be presented in response to different events, e.g., user input events. The elements shown in the user interfaces can be modified, supplemented, or replaced with other elements in various possible implementations.

Many alternatives to the processes described herein are possible. For example, processing stages can be separated into additional stages or combined into fewer stages. As another example, processing stages can be omitted or supplemented with other processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A portable device configured to be worn on a user's wrist, comprising:
   a processor;
   a wireless communication module;
   a linear or two-dimensional discrete light source array; and
   a memory having stored therein executable instructions configured to cause the portable device to:
   establish wireless communication with a master navigation device configured to generate route navigation events based on progress along a navigable route;
   receive information representing a first route navigation event from the master navigation device, wherein the first route navigation event is selected from a plurality of available route navigation events; and
   output a first route navigation prompt that corresponds to the first route navigation event, wherein the first route navigation prompt comprises a first illumination of a first portion of the discrete light source array that corresponds to the first route navigation event and distinguishes the first route navigation event from other available route navigation events,
   wherein the plurality of available route navigation events comprises a left-turn event, a right-turn event, and a keep-straight event, and wherein each of the left-turn event, right-turn event, and keep-straight event comprises illuminating at least a portion of the discrete light source array.

2. The portable device of claim 1, wherein the plurality of available route navigation events further comprise an arrive-at-destination event.

3. The portable device of claim 1, wherein the plurality of available route navigation events further comprise an off-route event.

4. The portable device of claim 1, wherein the discrete light source array comprises a multi-color LED.

5. The portable device of claim 1, wherein the discrete light source array comprises a plurality of LEDs.

6. The portable device of claim 1, wherein the executable instructions are further configured to cause the portable device to:
   receive information representing a second route navigation event from the master navigation device; and
   output a second route navigation prompt that corresponds to the second route navigation event, wherein the second route navigation prompt comprises a second illumination of a second portion of the discrete light source array that corresponds to the second route navigation event and distinguishes the second route navigation event from other available route navigation events.

7. The portable device of claim 6, wherein the discrete light source array comprises a multi-color LED, wherein the first illumination comprises illumination of the multi-color LED in a first color state, and wherein the second illumination comprises illumination of the multi-color LED in a second color state.

8. The portable device of claim 6, wherein the discrete light source array comprises a plurality of single-color LEDs, wherein the first illumination comprises illumination of at least one single-color LED having a first color, and wherein the second illumination comprises illumination of at least one single-color LED having a second color that differs from the first color.

9. The portable device of claim 1, further comprising a housing, wherein the discrete light source array is configured to emit light that is visible through the housing.

10. The portable device of claim 1, wherein the first route navigation prompt is accompanied by a vibration or an audible sound.

11. A device wearable on a user's wrist, comprising:
a processor;
a wireless communication module;
a user input device;
a linear or two-dimensional LED array comprising a plurality of LEDs; and
a memory having stored therein executable instructions configured to cause the wearable device to:
establish communication with a portable master navigation device via the communication module in response to input received via the user input device, wherein the portable master navigation device is configured to generate route navigation events based on progress along a navigable route;
receive information representing a first route navigation event from the portable master navigation device, wherein the first route navigation event is selected from a plurality of available route navigation events; and
output a first route navigation prompt that corresponds to the first route navigation event, wherein the first route navigation prompt comprises illumination of a first set of one or more of the plurality of LEDs that corresponds to the first route navigation event and, and wherein the illumination of the first set of LEDs distinguishes the first route navigation event from other available route navigation events,
wherein the plurality of available route navigation events comprises a left-turn event, a right-turn event, and a keep-straight event, and wherein each of the left-turn event, right-turn event, and keep-straight event comprises illuminating at least a portion of the LED array.

12. The wearable device of claim 11, wherein the illumination of the first set of LEDs comprises illumination at a position in the LED array that corresponds to the turn direction.

13. The wearable device of claim 11, wherein the executable instructions are further configured to cause the wearable device to:
receive information representing a second route navigation event from the portable master navigation device; and
output a second route navigation prompt that corresponds to the second route navigation event, wherein the second route navigation prompt comprises illumination of a second set of one or more of the plurality of LEDs that corresponds to the second route navigation event and that distinguishes the second navigation event from other available navigation events.

14. The wearable device of claim 11, wherein the first set of LEDs and the second set of LEDs are disjoint sets.

15. The wearable device of claim 11, wherein the first set of LEDs and the second set of LEDs share at least one LED.

16. A method comprising:
establishing a wireless communication link between a navigation prompt device, wearable on a user's wrist, comprising a linear or two-dimensional LED array, the LED array comprising a plurality of LEDs, and a portable master navigation device with GPS functionality, wherein the portable master navigation device is configured to generate route navigation events based on progress along a navigable route;
receiving, by the navigation prompt device, information representing a route navigation event from the portable master navigation device, wherein the route navigation event is selected from a plurality of available route navigation events; and
outputting, by the navigation prompt device, a route navigation prompt that corresponds to the route navigation event, wherein the route navigation prompt comprises illumination of a set of one or more of the plurality of LEDs that corresponds to the route navigation event and distinguishes the route navigation event from other available route navigation events,
wherein the plurality of available route navigation events comprises a left-turn event, a right-turn event, and a keep-straight event, and wherein each of the left-turn event, right-turn event, and keep-straight event comprises illuminating at least a portion of the LED array.

17. The method of claim 16, wherein the navigation prompt device further comprises a heart rate sensor, the method further comprising transmitting, by the navigation prompt device, heart rate information to the portable master navigation device.

18. A method comprising:
establishing a wireless communication link between a, portable navigation prompt device, wearable on a user's wrist, comprising a linear or two-dimensional discrete light source array and a portable master navigation device, wherein the portable master navigation device is configured to generate route navigation events based on progress along a navigable route; and
transmitting, by the portable master navigation device, information representing a route navigation event to the portable navigation prompt device, wherein the route navigation event is selected from a plurality of available route navigation events, wherein the transmitted information is configured to cause the portable navigation prompt device to illuminate a portion of the discrete light source array corresponding to the route navigation event and distinguishing the route navigation event from other available route navigation events,
wherein the plurality of available route navigation events comprises a left-turn event, a right-turn event, and a keep-straight event, and wherein each of the left-turn event, right-turn event, and keep-straight event comprises illuminating at least a portion of the discrete light source array.

19. The method of claim 18, the method further comprising receiving, by the portable master navigation device, heart rate information from the portable navigation prompt device.

* * * * *